(12) United States Patent
Yap et al.

(10) Patent No.: US 9,505,549 B2
(45) Date of Patent: Nov. 29, 2016

(54) CARRIER FOR A BUNDLE OF FAN FOLDED SHEET MATERIAL TO BE CONVERTED INTO DUNNAGE

(71) Applicant: Ranpak Corp., Concord Township, OH (US)

(72) Inventors: Franklin B. Yap, Willoughby, OH (US); Steven M. Toneff, Painesville, OH (US); Robert C. Cheich, Independence, OH (US); Joseph J. Harding, Mentor, OH (US); Judith L. Skiba, Kingsville, OH (US); James A. Simmons, Jr., Painesville Township, OH (US); James Tekavec, Willoughby, OH (US); Edward W. Lintala, Concord, OH (US); Erwin Methorst, Holtum (NL); Koen H. M. Kuypers, Amsterdam (NL); Dan Coppus, Doenrade (NL); Raimond P. M. Demers, Landgraaf (NL); Pierre Kobben, Bocholtz (NL)

(73) Assignee: Ranpak Corp., Concord Township, OH (US)

( * ) Notice: Subject to any disclaimer, the term of this patent is extended or adjusted under 35 U.S.C. 154(b) by 116 days.

(21) Appl. No.: 14/493,109

(22) Filed: Sep. 22, 2014

(65) Prior Publication Data
US 2015/0014205 A1  Jan. 15, 2015

Related U.S. Application Data

(63) Continuation of application No. 13/983,418, filed as application No. PCT/US2011/066361 on Dec. 21, 2011, now abandoned, which is a continuation of application No. 13/117,585, filed on May 27, 2011, now abandoned.

(60) Provisional application No. 61/442,779, filed on Feb. 14, 2011.

(51) Int. Cl.
*B65D 85/16* (2006.01)
*B65G 57/03* (2006.01)
(Continued)

(52) U.S. Cl.
CPC .............. *B65D 85/16* (2013.01); *B65D 5/54* (2013.01); *B65D 71/02* (2013.01);
(Continued)

(58) Field of Classification Search
CPC .. B65D 75/5827; B65D 71/02; B65D 83/08; B65D 83/0805; B65D 85/16; B65D 5/54
See application file for complete search history.

(56) References Cited

U.S. PATENT DOCUMENTS 4,778,057 A * 10/1988 Allen ................. B65D 75/5888
206/494
6,918,489 B2 * 7/2005 Harding ............... B31D 5/0047
206/451

(Continued)

FOREIGN PATENT DOCUMENTS

WO      2012/112215      8/2012

OTHER PUBLICATIONS

International Search Report and accompanying Written Opinion for WO 2012/112215A1.

*Primary Examiner* — Andrew Perreault
(74) *Attorney, Agent, or Firm* — Renner, Otto, Boisselle and Sklar LLP

(57) ABSTRACT

A method of loading a stack of sheet stock material for use by a dunnage conversion machine, includes the following steps: (i) providing first and second stacks, the second stack being protected by a carrier having a central portion and longitudinally-spaced extensions that bound a central portion, the extensions and the central portion being joined along a weakened area defining a tear line, the central portion and the longitudinally-spaced extensions forming a planar bottom panel and a planar side panel, each panel extending substantially the length of the stack, and at a right angle to each other about a fold line over a bottom and an adjacent side of the stack, and one or more bale ties longitudinally inwardly of the tear lines holding the carrier to the stack; (ii) removing the extensions from the carrier; (iii) setting the second stack on top of the first stack; and (iv) removing the bale ties and the carrier, whereby an adhesive bonds the top page of the first stack to the bottom page of the second stack.

8 Claims, 6 Drawing Sheets

(51) Int. Cl.

| | | |
|---|---|---|
| *B65D 75/58* | (2006.01) | |
| *B65D 71/02* | (2006.01) | |
| *B65D 83/08* | (2006.01) | |
| *B65D 5/54* | (2006.01) | |
| *B65D 85/62* | (2006.01) | |

(52) U.S. Cl.
CPC ......... *B65D 75/5827* (2013.01); *B65D 83/08* (2013.01); *B65D 83/0805* (2013.01); *B65D 85/62* (2013.01); *B65G 57/03* (2013.01); *B31D 2205/0035* (2013.01); *B65H 2701/1824* (2013.01); *B65H 2701/1944* (2013.01); *B65H 2801/63* (2013.01)

(56) References Cited

U.S. PATENT DOCUMENTS 7,789,232 B2 * 9/2010 Suito .................... B41J 13/0081
206/449

2010/0041534 A1    2/2010    Harding et al.

\* cited by examiner

CARRIER FOR A BUNDLE OF FAN FOLDED SHEET MATERIAL TO BE CONVERTED INTO DUNNAGE

RELATED APPLICATIONS

This application claims the benefit of U.S. Provisional Patent Application No. 61/442,779, filed Feb. 14, 2011; U.S. patent application Ser. No. 13/117,585, filed May 27, 2011; which is a divisional of U.S. patent application Ser. No. 12/603,756, filed Oct. 22, 2009; which is a divisional of U.S. patent application Ser. No. 11/557,446, filed Nov. 7, 2006; which is a continuation of U.S. patent Ser. No. 11/184,354, filed Jul. 19, 2005; which is a divisional of U.S. patent application Ser. No. 10/420,519 filed Apr. 22, 2003, now U.S. Pat. No. 6,918,489; which claims the benefit under 35 USC §119(e) of earlier-filed U.S. Provisional Application Nos. 60/433,548, filed on Dec. 13, 2002; 60/421,996, filed on Oct. 29, 2002; 60/412,127, filed on Sep. 18, 2002; and 60/375,149, filed on Apr. 22, 2002; and all of these documents are hereby incorporated herein by reference in their entireties.

FIELD OF THE INVENTION

The present invention relates to the production of a dunnage product, and more particularly, to a fan-folded stock material for improved loading for a dunnage conversion machine.

BACKGROUND

In the process of shipping one or more articles in container, such as a cardboard box, from one location to another, a packer typically places some type of dunnage material in the shipping container along with the article or articles to be shipped. The dunnage material partially or completely fills the empty space or void volume around the articles in the container. By filling the void volume or cushioning or otherwise protecting the article, the dunnage prevents or minimizes damage to the articles during shipment.

To use storage space more efficiently, a dunnage conversion machine can be used to convert a supply of stock material, such as a roll or stack of paper, into a lower density dunnage product. For example, U.S. Pat. No. 6,676,589 discloses an exemplary dunnage conversion machine that can convert a continuous sheet of paper into a crumpled strip of void-fill dunnage. This patent is hereby incorporated herein by reference. Such a converter can convert a compact supply of stock material into a much greater volume of dunnage.

SUMMARY OF THE INVENTION

The present invention adds removable, protective extensions to a carrier for stacks of fan-folded sheet material, preferably paper, that will be spliced to another stack before conversion to a dunnage product. The conversion process lowers the density, from a relatively high density of the sheet material to a relatively lower density of the resulting dunnage product. In previous carrier designs, a bottom layer of the stack can be inwardly folded under the stack during transport. If not noticed before attempting to splice the stack to another stack, more than two pages are secured together and are pulled as a unit into the dunnage conversion machine, often resulting in a severe jam. Other problems also can arise, such as a failure of the splicing adhesive to hold any pages together. The new protective extensions provided by the invention are left on the carrier during transport to protect the edges of the stack and prevent inwardly-folded corners of the pages. The protective extensions are removed by the operator to allow for secure splicing between two stacks without securing more than two pages together.

The carrier provided by the invention secures the bottom of the stack with full length, full width cardboard during transport. The carrier is perforated or otherwise weakened on either side so that it can be shortened in length by pulling on two extensions on opposed sides of a central portion of the carrier. To splice two bundles together, the extensions are pulled to separate along the perforations from the central portion while holding the bundle by its strap or straps. The bundle is then loaded in a stand or other containment vessel or support structure in the usual manner before being fed into a dunnage converter. Removing only the protective extensions allows the operator to handle the bundle without worry, since the remainder of the carrier and the strap or straps still provide sufficient rigidity to load the bundle into a cart or other containment vessel. If the carrier and strapping are both removed, the likelihood that the bundle will unfold like a released spring greatly increases. Once the protective extensions are removed, the operator places the stack on top of a previous stack, removes the strapping and the remainder of the carrier, and splices the top page of the bottom stack to the bottom page of the top stack. The splice can be provided by an adhesive, preferably a pre-applied adhesive on the top page or the bottom page. The adhesive typically is covered by a release liner until the operator is ready to splice the two bundles together.

More particularly, the present invention provides a bundle of sheet stock material for a dunnage conversion machine that comprises a rectangular stack of fan-folded sheet material having a height, a width, and a length, and a carrier. The carrier has a central portion and longitudinally-spaced extensions that bound the central portion. The extensions and the central portion are joined along a weakened area defining a tear line. The central portion and the longitudinally-spaced extensions forming a planar bottom panel and a planar side panel, the bottom panel and the side panel being separated by a longitudinally-extending fold line. Each panel extends substantially the length of the stack. And the bottom panel and the side panel extend at a right angle to each other over a bottom and an adjacent side of the stack to protect edges along the full length of the stack. Both the extensions and the central portion extend across the fold line.

In one embodiment, the central portion terminates short of the edge of the stack to form a window in the bottom panel that exposes a portion of the bottom page of the stack to facilitate splicing the stack to another stack. Additionally or alternatively, the bundle includes one or more bale ties extending around the carrier and the stack to secure the carrier to the stack. The bale ties are positioned longitudinally inwardly of the tear lines.

To facilitate splicing, the bundle can include an adhesive on at least one of a top page and a bottom page of the stack. In which case, the bundle can further include a release liner covering the adhesive layer until ready for use.

In an exemplary embodiment, the carrier has an L-shape cross-section, the carrier includes cardboard, and/or the sheet material includes paper.

The present invention also provides a method of loading a stack of sheet stock material onto a second stack of sheet stock material. The method includes the following steps: (i) providing first and second stacks of fan-folded sheet stock material with an adhesive layer applied to the top of the first stack or the bottom of the second stack, the second stack being provided in the form of a bundle comprising the stack, a carrier having a central portion and longitudinally-spaced extensions that bound a central portion, the extensions and the central portion being joined along a weakened area defining a tear line, the central portion and the longitudinally-spaced extensions forming a planar bottom panel and a planar side panel, the bottom panel and the side panel being separated by a longitudinally-extending fold line, each panel extending substantially the length of the stack and at a right angle to each other over a bottom and an adjacent side of the stack to protect edges along the full length of the stack, and one or more bale ties longitudinally inwardly of the tear lines holding the carrier to the stack; (ii) removing the extensions from the carrier; (iii) setting the second stack on top of the first stack; and (iv) removing the bale ties and the carrier, whereby the adhesive bonds the top page of the first stack to the bottom page of the second stack.

Finally, the present invention provides a carrier for a stack of fan-folded sheet stock material for a dunnage conversion machine. The carrier has a central portion and longitudinally-spaced extensions that bound the central portion. The extensions and the central portion are joined along a weakened area defining a tear line. The central portion and the longitudinally-spaced extensions form a planar bottom panel and a planar side panel. The bottom panel and the side panel are separated by a longitudinally-extending fold line. Each panel extends substantially the length of the stack, and the panels can be positioned at a right angle to each other when folded about the fold line to cover over a bottom and an adjacent side of a stack of fan-folded sheet stock material to protect edges along the full length of the stack.

The foregoing and other features of the invention are hereinafter fully described and particularly pointed out in the claims, the following description and annexed drawings setting forth in detail certain illustrative embodiments of the invention, these embodiments being indicative, however, of but a few of the various ways in which the principles of the invention may be employed.

DETAILED DESCRIPTION

Figure 1:
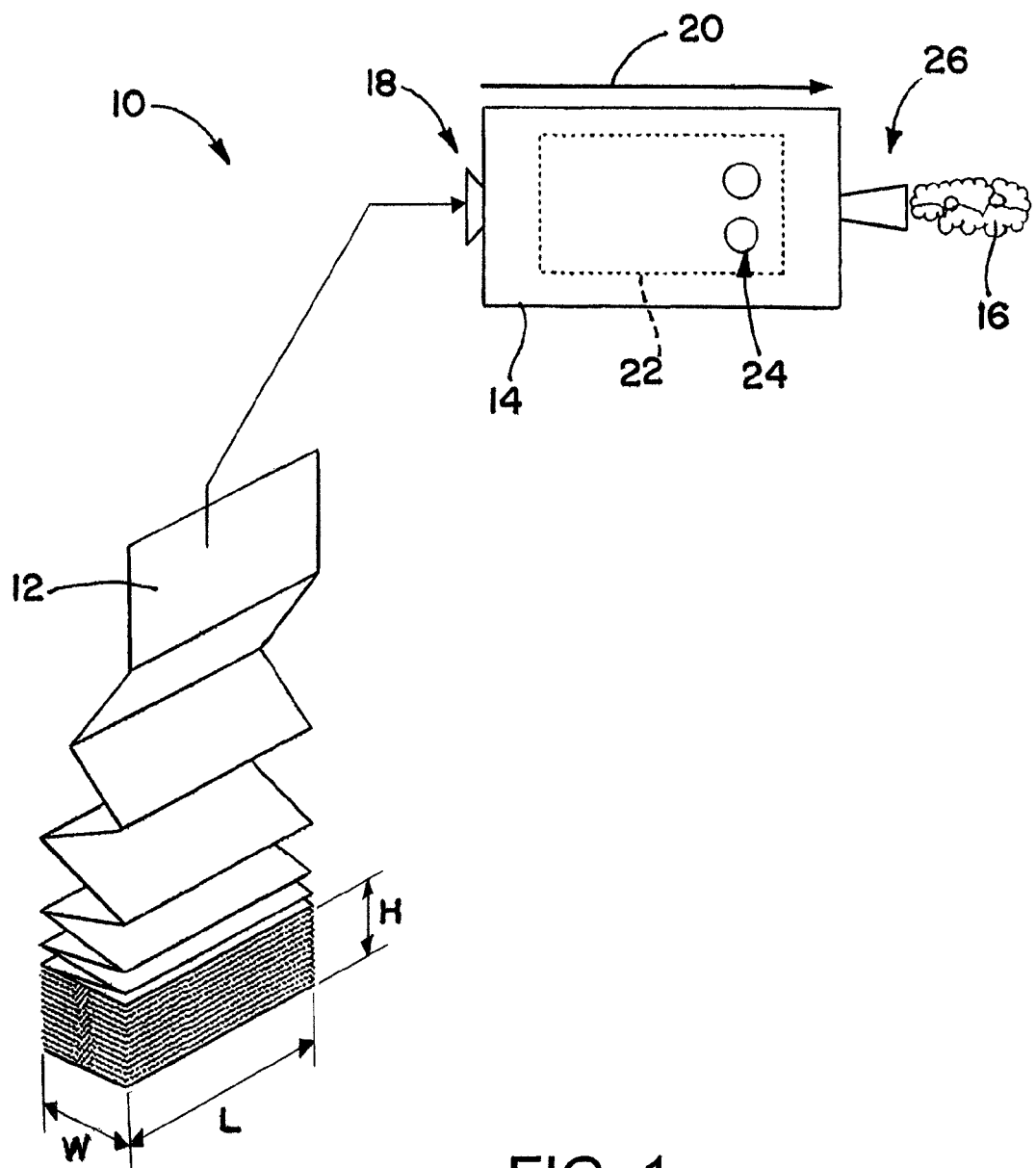
FIG. 1 is a schematic representation of an exemplary dunnage conversion system.

Referring now to the drawings in detail and initially to FIG. 1, there is shown a dunnage conversion system 10, including a stack of fan-folded sheet stock material 12 and a dunnage conversion machine 14. A series of folds together form a sequence of rectangular pages which are piled accordion style one on top of the other to form the stack of sheet stock material 12. The stack of fan-folded sheet material 12 has a height H, a width W, and a length L parallel to the folds that define the pages. The dunnage conversion machine 14 converts the sheet stock material 12, such as recyclable and reusable kraft paper, into a strip of relatively lower density dunnage product 16 including, for example, a relatively narrow three dimensional strip or rope of a generally cylindrical shape. The stock material 12 enters an upstream end 18 of the machine 14 and moves in an upstream-to-downstream direction 20 through a conversion assembly 22. The conversion assembly 22 typically includes one or more rotating members 24 that move the stock material through the machine 14 as it is converted from the relatively higher density sheet material 12 to the relatively lower density dunnage product 16 dispensed from a downstream end 26 of the machine 14 for use as an environmentally responsible protective packaging material typically used as void fill or cushioning during shipping.

Figure 2:
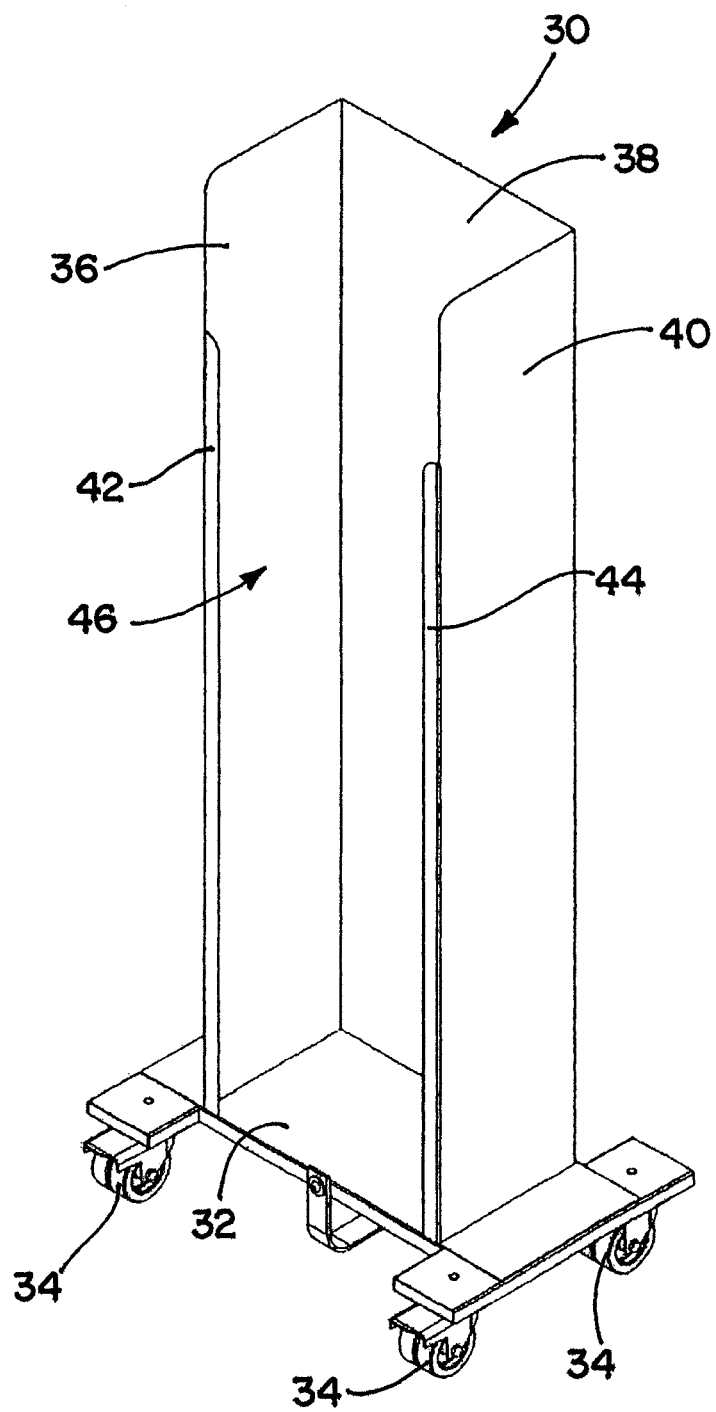
FIG. 2 is a perspective view of a cart for supporting a supply of stock material for a dunnage conversion machine in the system of FIG. 1.
Figure 3:
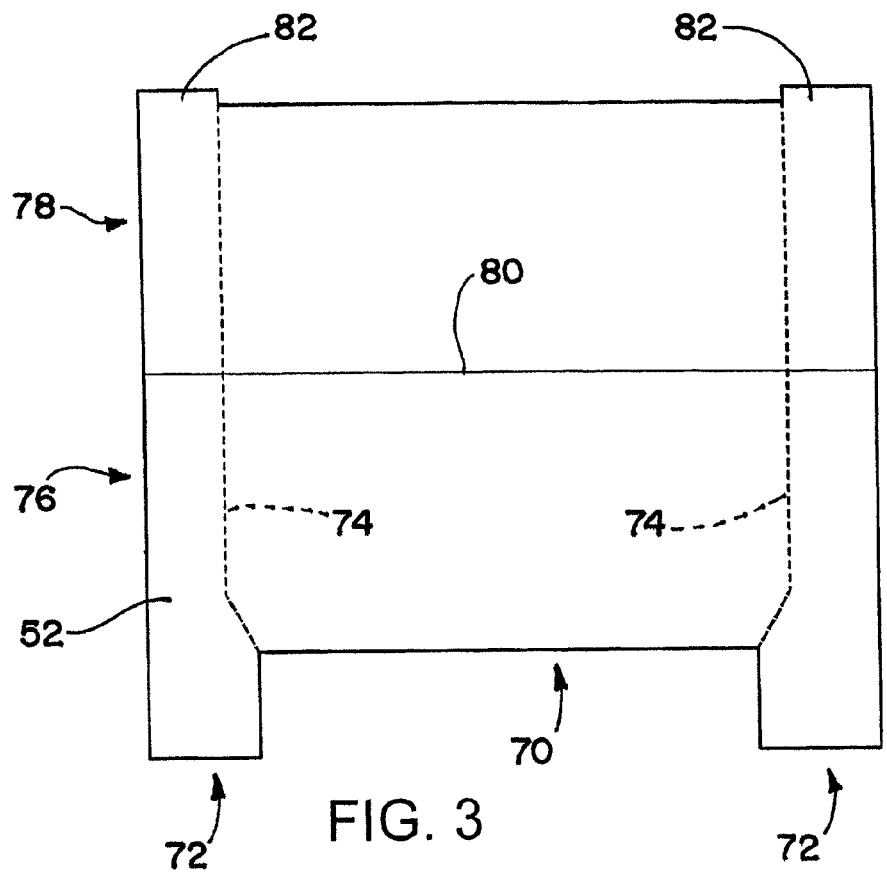
FIG. 3 is a plan view of a carrier provided by the invention for protecting a stack of sheet stock material.
Figure 4:
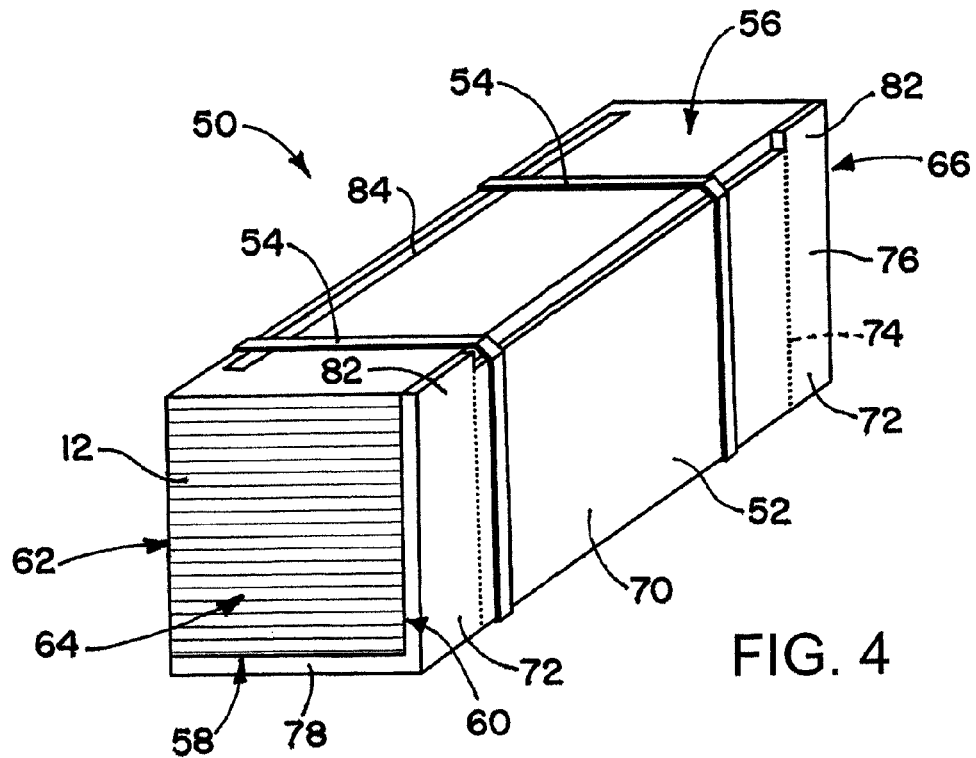
FIG. 4 is a perspective view of a bundle of sheet stock material provided by the invention, including the carrier of FIG. 3.
Figure 5:
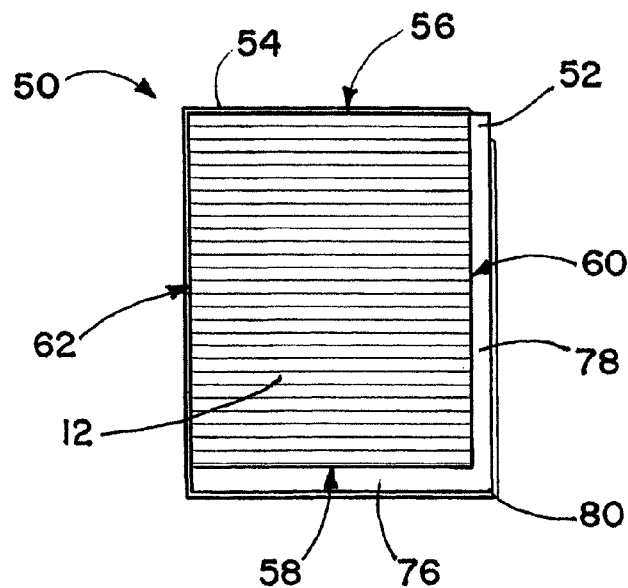
FIG. 5 is an end view of the bundle of FIG. 4.
Figure 6:
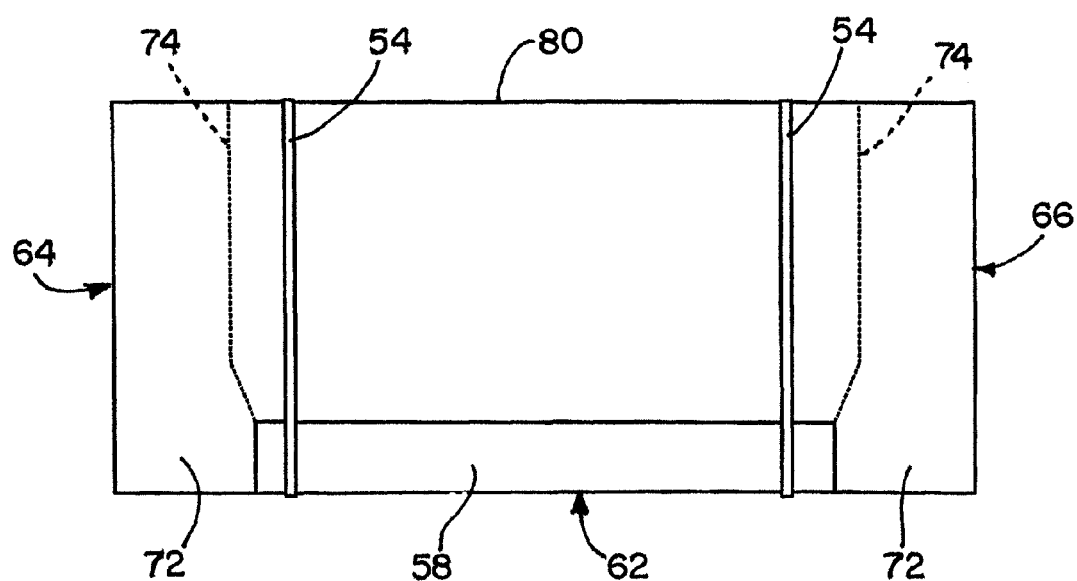
FIG. 6 is a bottom view of the bundle of FIG. 4.

A supply of sheet stock material typically includes one or more stacks of fan-folded sheet stock material 12. To support multiple stacks, the supply typically includes a containment vessel in which the stacks are supported for sequential feeding into a dunnage conversion machine 14 (FIG. 1). An exemplary containment vessel includes the stand shown in FIG. 2. The stand 30 is oriented in a generally vertical manner and includes a base 32 and a plurality of upright guide members that can hold one or more stacks in an upright orientation. The bottom corners of the base 32 include wheels 34 so that the stand 30 may be moved easily, allowing the stand 30 to function as a cart. The terms stand and cart are used interchangeably herein since both function to support multiple stacks of sheet stock material in the same manner. The upright guide members form a volume defined by left 36, rear 38, right 40, and front 42 and 44 upright guide members. The front upright guide members 42 and 44 are spaced apart to create a window 46 into the storage volume for the stacks of sheet stock material. The window 46 facilitates loading and splicing stacks together for sequential feeding into the dunnage conversion machine 14 (FIG. 1), and also provides a way to see how much stock material remains in the stand 30.

FIGS. 3-6 illustrate an exemplary bundle 50 of sheet material provided by the present invention and its constituent parts. The bundle 50 includes a stack of fan-folded sheet stock material 12, a carrier 52, and one or more bale ties 54 securing the carrier 52 to the stack 12. The stack of sheet stock material 12 has a top 56, a bottom 58, a front side 60, a rear side 62, a left side 64, and a right side 66. The carrier 52 and bale ties 54 maintain and protect the stack of sheet stock material 12 in a compressed and upright form. The bundle 50 interchangeably can be referred to as a baled stack, the carrier 52 interchangeably can be referred to as a jacket, and the bale ties 54 interchangeably can be referred to as straps or strapping. The baled stacks 50 may be easily stored and/or transported, loaded into the dunnage conversion machine stand 30 (FIG. 2), and spliced to another stack of sheet stock material, as explained below.

The carrier 52 helps to protect and support the stack 12 during storage and transport. The carrier 52 may be made of any suitably stiff material, for example, cardboard or plastic. The carrier 52 has a central portion 70 and longitudinally-spaced extensions 72 that bound the central portion 70. The extensions 72 and the central portion 70 are joined along a weakened area defining a tear line 74. The weakened area can be formed by scoring or perforating or otherwise weakening the carrier material to facilitate separating the extensions 72 from the central portion 70.

The central portion 70 of the carrier 12 and the longitudinally-spaced extensions 72 form a planar bottom panel 76 that extends over the bottom of the stack 12 and a planar side panel 78 that extends over a front side 60 of the stack 12. Each panel 76 and 78 extends substantially the full length L of the stack 12. The bottom panel 76 and the side panel 78 are separated by a longitudinally-extending fold line 80. Both the extensions 72 and the central portion 70 extend across the fold line, whereby portions of both the bottom panel 76 and the side panel 78 are defined by portions of both the extensions 72 and the central portion 70. The fold line 80 facilitates folding the carrier 52 from a substantially planar pre-folded configuration (FIG. 3) to the folded configuration shown in FIG. 4. When the bottom panel 76 and the side panel 78 are folded about the fold line 80 they extend at a right angle to each other to cover the bottom and an adjacent side, such as the front side 60, of the stack 12 to protect edges along the full length of the stack 12. When folded in this manner, the carrier 52 has an L-shape cross-section.

In the illustrated embodiment, the central portion 70 terminates short of the edge at the rear side 62 of the stack 12 to form a window in the bottom panel 76 that exposes a portion of the bottom page of the stack 12 to facilitate splicing the bottom page to the top page of another stack. The central portion 70 also terminates short of the edge at the top side 56 of the stack 12 to form tab portions 82 in the extensions 72. These tab portions 82 make it easier to grasp the top of the extensions 72 to separate the extensions from the central portion 70 along the tear lines 74.

The carrier 52 is secured to the stack of sheet stock material 12 by one or more bale ties 54, and in the illustrated embodiment by a pair of longitudinally-spaced bale ties 54. The bale ties 54 extend around the carrier 52 and the stack 12 to secure the carrier 52 to the stack 12 and to compress the stack 12 into a compact state for storage and transport. The bale ties 54 may be made of any suitable material, for example, nylon or wire, and may take the form of flat straps or string or cable. The bale ties 54 are positioned longitudinally inwardly of the tear lines 74 so that the extensions 72 can be removed without removing the bale ties 54.

An adhesive layer, for example glue or a double sided adhesive tape, is applied to the top 56 of the stack of sheet stock material 12. Additionally or alternatively, the adhesive layer may be applied on the bottom 58 of the stack 12. A release liner 84, which is larger than the strip of adhesive, covers the adhesive layer until ready for use. The adhesive layer and the release liner 84 generally are disposed parallel and adjacent to a leading end of the top page or a trailing end of the bottom page in the stack 12 to splice to a corresponding leading or trailing end of another stack placed on top of or below the stack 12.

Figure 7:
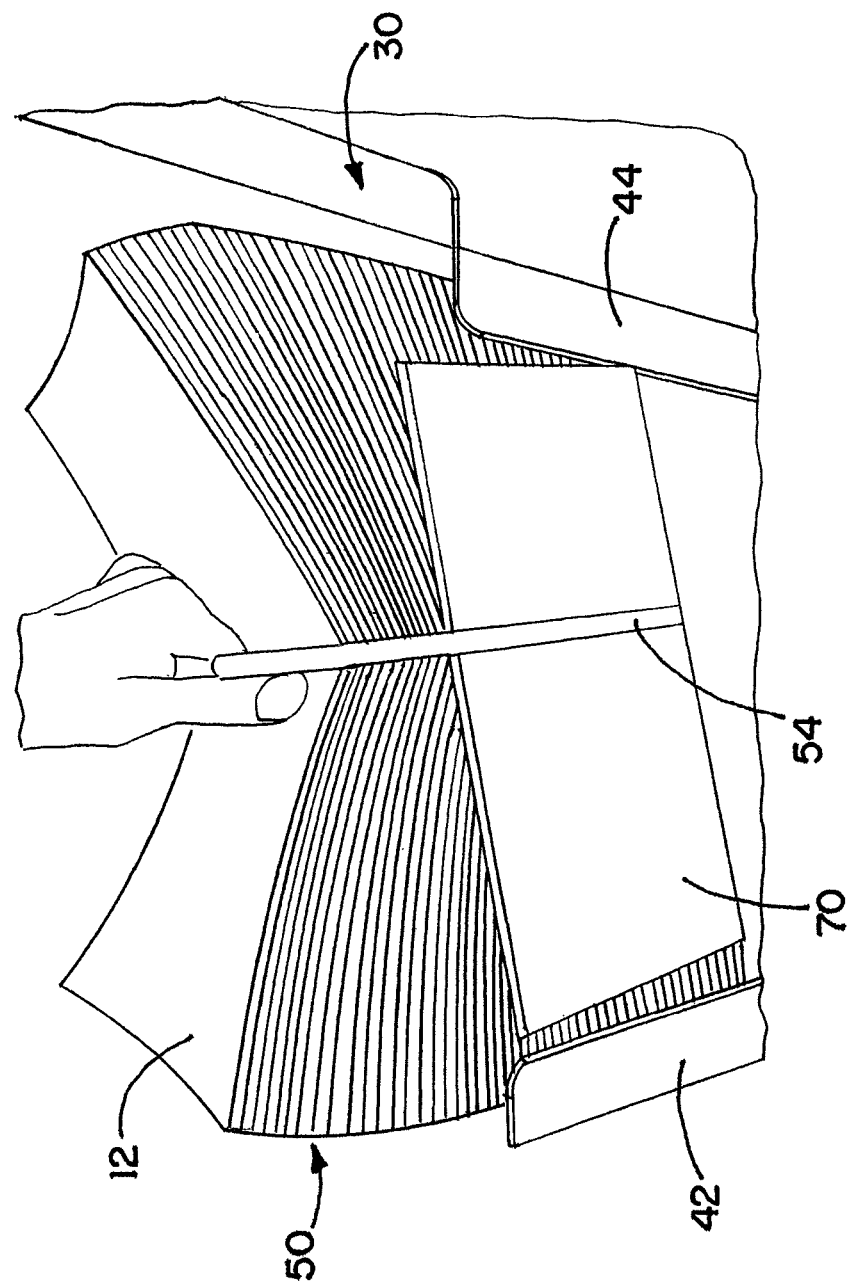
FIG. 7 illustrates a stack of sheet stock material being loaded into cart similar to the cart shown in FIG. 2.
Figure 8:
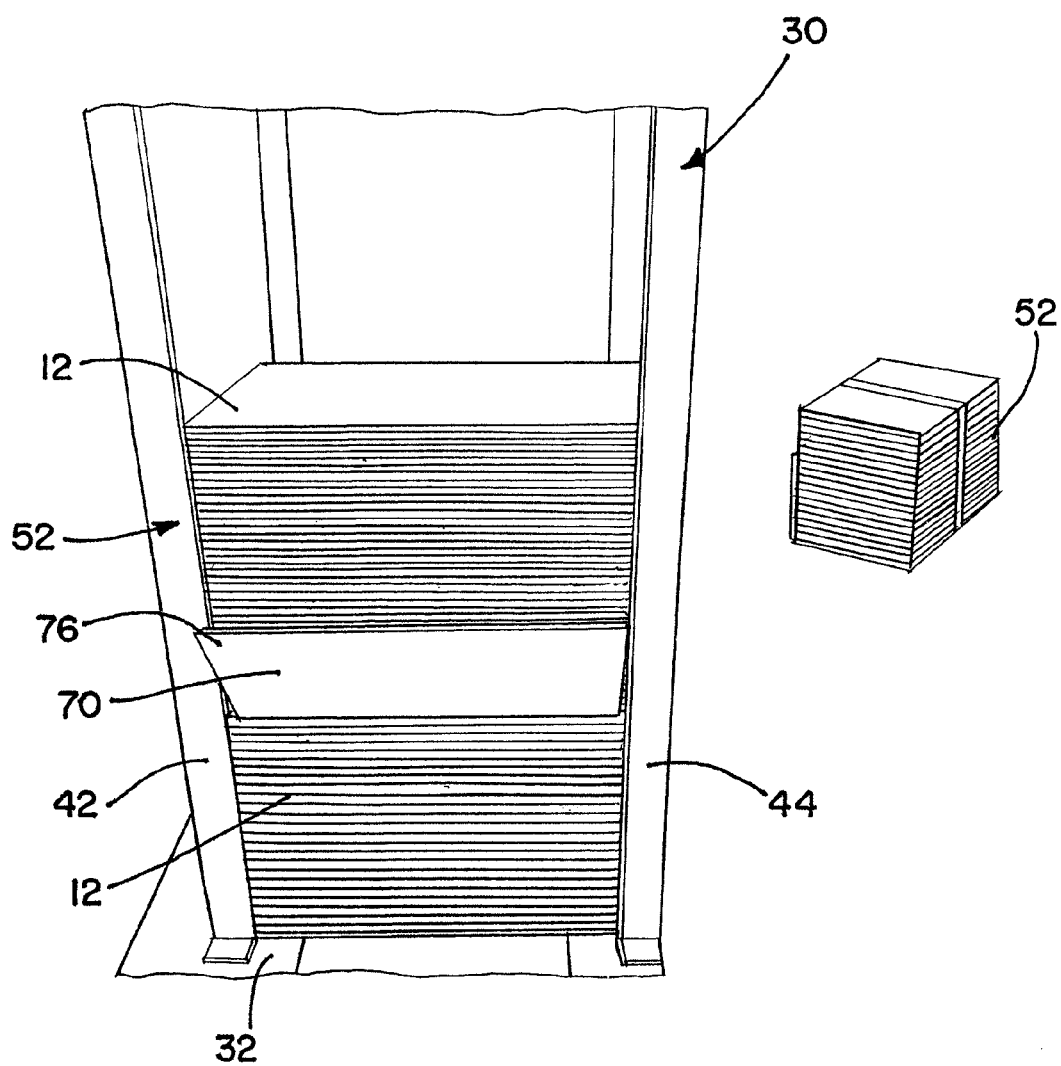
FIG. 8 illustrates a second stack of sheet stock material loaded onto a first stack of sheet stock material in a cart similar to the cart shown in FIG. 2.

To load a bundle or baled stack 50 into the cart 30 (FIG. 2) or other containment vessel, the extensions 72 are removed from the carrier 52. The bundle 50 is then lifted over the upright guide members 42 and 44 and lowered into the cart 30, such as by grasping the one or more bale ties 54 that secure the carrier 52 to the stack 12, as shown in FIG. 7. Retaining the bale ties 54 while loading the baled stack 50 into the cart 30 not only provides a convenient way to hold the baled stack 50 and move it into place, but it also helps to keep the stack 12 together while it is being loaded. And the central portion 70 of the carrier 52 also helps to keep the stack 12 of fan-folded sheet material together during the loading operation.

Note that in this embodiment, the extensions 72 may interfere with the front upright guide members 42 and 44, making it more difficult to insert the baled stack 50 without removing the extensions 72. Moreover, if the extensions 72 were left attached to the central portion 70 of the carrier 50 when the baled stack 50 was inserted into the cart 30, the front upright guide members 42 and 44 would make it difficult, if not impossible, to remove the carrier 52 from the cart 30.

Any desired quantity of baled stacks 50 may be stacked one on top of the other, such quantity being limited to the height available between the base 32 (FIG. 2) of the cart 30 and the top of the upright guide members 36, 38, 40, 42, and 44 extending thereabove. If this is the first stack, the baled stack 50 is supported on the base 32 (FIG. 2) of the cart 30. If this is the second or subsequent stack, the release liner 84 is removed from the appropriate stack, in this case the lower stack, before the baled stack 50 is lowered onto the preceding stack in the cart 30. The weight of the upper stack generally is sufficient to activate the adhesive and splice the top and bottom pages of the respective stacks together. After the baled stack 50 is loaded into place, the bale ties 54 can be removed, typically by cutting the bale ties 54 and pulling them out from under the stack 12 and through the window 46 in the front of the cart 30. After the bale ties 54 have been removed, the central portion 70 of the carrier 52 can be removed by grasping the side panel 78 and pulling the bottom panel 76 from under the stack 12 and through the window 46 in the front of the cart 30. If the top and bottom pages of the respective stacks have not already bonded, removing the bale ties 54 and the carrier 52 allows the upper (second) stack to drop fully onto the lower (first) stack, whereby the adhesive bonds the top page of the first stack to the bottom page of the second stack.

As will be appreciated, the carrier 52 preferably is dimensioned in view of the cart 30 in which it will be loaded. For example, the central portion 70 of the carrier 52 preferably is shorter than the length of the window 46 extending between the left and right front upright guide members 42 and 44 in the illustrated cart 30. If the central portion 70 of the carrier 52 is longer than the span between the upright guide members 42 and 44, the central portion 70 may need to be tilted or otherwise manipulated to be removed from the cart 30. If the central portion 70 is shorter than the span between the upright guide members 42 and 44, the central portion 70, no tilting or manipulation is necessary and the central portion 70 of the carrier 52 can be removed from the cart 30 more easily.

In summary, the present invention provides a method of loading a stack of sheet stock material for use by a dunnage conversion machine, includes the following steps: (i) providing first and second stacks, at least one of the first stack having an adhesive on a top page or the second stack having an adhesive on a bottom page, the second stack being protected by a carrier having a central portion and longitudinally-spaced extensions that bound a central portion, the extensions and the central portion being joined along a weakened area defining a tear line, the central portion and the longitudinally-spaced extensions forming a planar bottom panel and a planar side panel, each panel extending substantially the length of the stack, and at a right angle to each other about a fold line over a bottom and an adjacent side of the stack, and one or more bale ties longitudinally inwardly of the tear lines holding the carrier to the stack; (ii) removing the extensions from the carrier; (iii) setting the second stack on top of the first stack; and (iv) removing the bale ties and the carrier, whereby the adhesive bonds the top page of the first stack to the bottom page of the second stack.

More particularly, the invention can provide one or more of the features found in the following clauses:

A. A bundle of sheet stock material for a dunnage conversion machine, comprising:
a rectangular stack of fan-folded sheet material having a height, a width, and a length, and
a carrier having a central portion and longitudinally-spaced extensions that bound the central portion, the extensions and the central portion being joined along a weakened area defining a tear line, the central portion and the longitudinally-spaced extensions forming a planar bottom panel and a planar side panel, the bottom panel and the side panel being separated by a longitudinally-extending fold line, each panel extending substantially the length of the stack and at a right angle to each other over a bottom and an adjacent side of the stack to protect edges along the full length of the stack.

B. A bundle as set forth in clause A or any other clause, where both the extensions and the central portion extend across the fold line.

C. A bundle as set forth in clause A or any other clause, where the central portion terminates short of the edge of the stack to form a window in the bottom panel that exposes a portion of the bottom page of the stack.

D. A bundle as set forth in clause A or any other clause, comprising one or more bale ties extending around the carrier and the stack to secure the carrier to the stack, the bale ties positioned longitudinally inwardly of the tear lines.

E. A bundle as set forth in clause A or any other clause, comprising an adhesive on at least one of a top page and a bottom page of the stack.

F. A bundle as set forth in clause E, comprising a release liner covering the adhesive layer until ready for use.

G. A bundle as set forth in clause A or any other clause, where the carrier has an L-shape cross-section.

H. A bundle as set forth in clause A or any other clause, where the carrier includes cardboard.

I. A bundle as set forth in clause A or any other clause, where the sheet material includes paper.

J. A method of loading a stack of sheet stock material for use by a dunnage conversion machine, comprising the steps of:
(i) providing first and second stacks of fan-folded sheet stock material with an adhesive layer applied to the top of the first stack or the bottom of the second stack, the second stack being provided in the form of a bundle comprising the stack, a carrier having a central portion and longitudinally-spaced extensions that bound the central portion, the extensions and the central portion being joined along a weakened area defining a tear line, the central portion and the longitudinally-spaced extensions forming a planar bottom panel and a planar side panel, the bottom panel and the side panel being separated by a longitudinally-extending fold line, each panel extending substantially the length of the stack and at a right angle to each other over a bottom and an adjacent side of the stack to protect edges along the full length of the stack, and one or more bale ties longitudinally inwardly of the tear lines holding the carrier to the stack;
(ii) removing the extensions from the carrier;
(iii) setting the second stack on top of the first stack; and
(iv) removing the bale ties and the carrier, whereby the adhesive bonds the top page of the first stack to the bottom page of the second stack.

K. A carrier for a stack of fan-folded sheet stock material for a dunnage conversion machine, the carrier having a central portion and longitudinally-spaced extensions that bound a central portion, the extensions and the central portion being joined along a weakened area defining a tear line, the central portion and the longitudinally-spaced extensions forming a planar bottom panel and a planar side panel, the bottom panel and the side panel being separated by a longitudinally-extending fold line, each panel extending substantially the length of the stack, and the panels can be positioned at a right angle to each other when folded about the fold line to cover over a bottom and an adjacent side of a stack of fan-folded sheet stock material to protect edges along the full length of the stack.

Although the invention has been shown and described with respect to a certain illustrated embodiment or embodiments, equivalent alterations and modifications will occur to others skilled in the art upon reading and understanding the specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function (i.e., that is functionally equivalent), even though not structurally equivalent to the disclosed structure which performs the function in the herein illustrated embodiment or embodiments of the invention.

We claim:

1. A bundle of sheet stock material for a dunnage conversion machine, comprising:
a rectangular stack of fan-folded sheet material having a height, a width, and a length, and
a carrier having a central portion and longitudinally-spaced extensions that bound the central portion, the extensions and the central portion being joined along a weakened area defining a tear line, the central portion and the longitudinally-spaced extensions forming a planar bottom panel and a planar side panel, the bottom panel and the side panel being separated by a longitudinally-extending fold line, each panel extending substantially the length of the stack and at a right angle to each other over a bottom and an adjacent side of the stack to protect edges along the length of the stack, where the central portion terminates short of a longitudinally-extending edge of the stack to form a window in the bottom panel that exposes a portion of the bottom of the stack.

2. The bundle as set forth in claim 1, where both the extensions and the central portion extend across the fold line.

3. The bundle as set forth in claim 1, comprising one or more bale ties extending around the carrier and the stack to secure the carrier to the stack, the bale ties positioned longitudinally inwardly of the tear lines.

4. The bundle as set forth in claim 1, comprising an adhesive on at least one of a top page and a bottom page of the stack.

5. The bundle as set forth in claim 4, comprising a release liner covering the adhesive layer until ready for use.

6. The bundle as set forth in claim 1, where the carrier has an L-shape cross-section.

7. The bundle as set forth in claim 1, where the carrier includes cardboard.

8. The bundle as set forth in claim 1, where the sheet material includes paper.

* * * * *